United States Patent Office 3,437,834
Patented Apr. 8, 1969

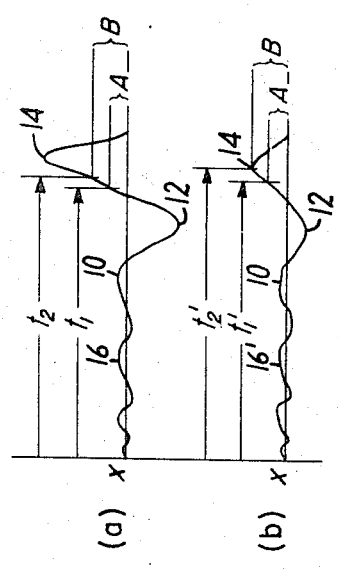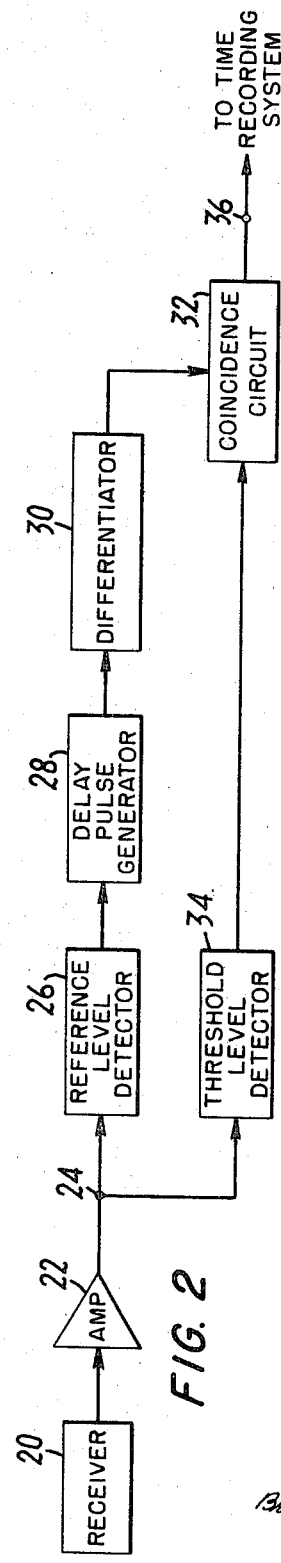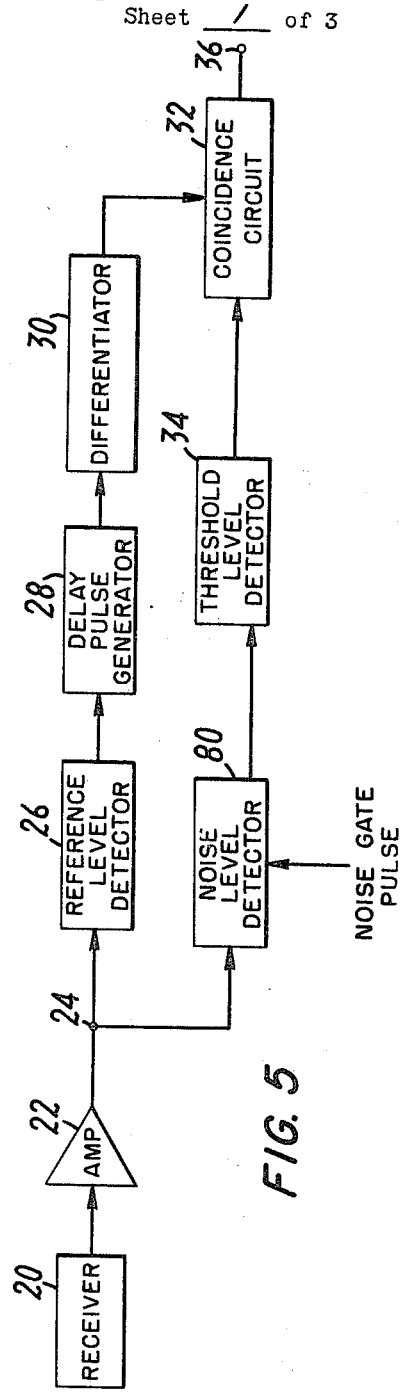

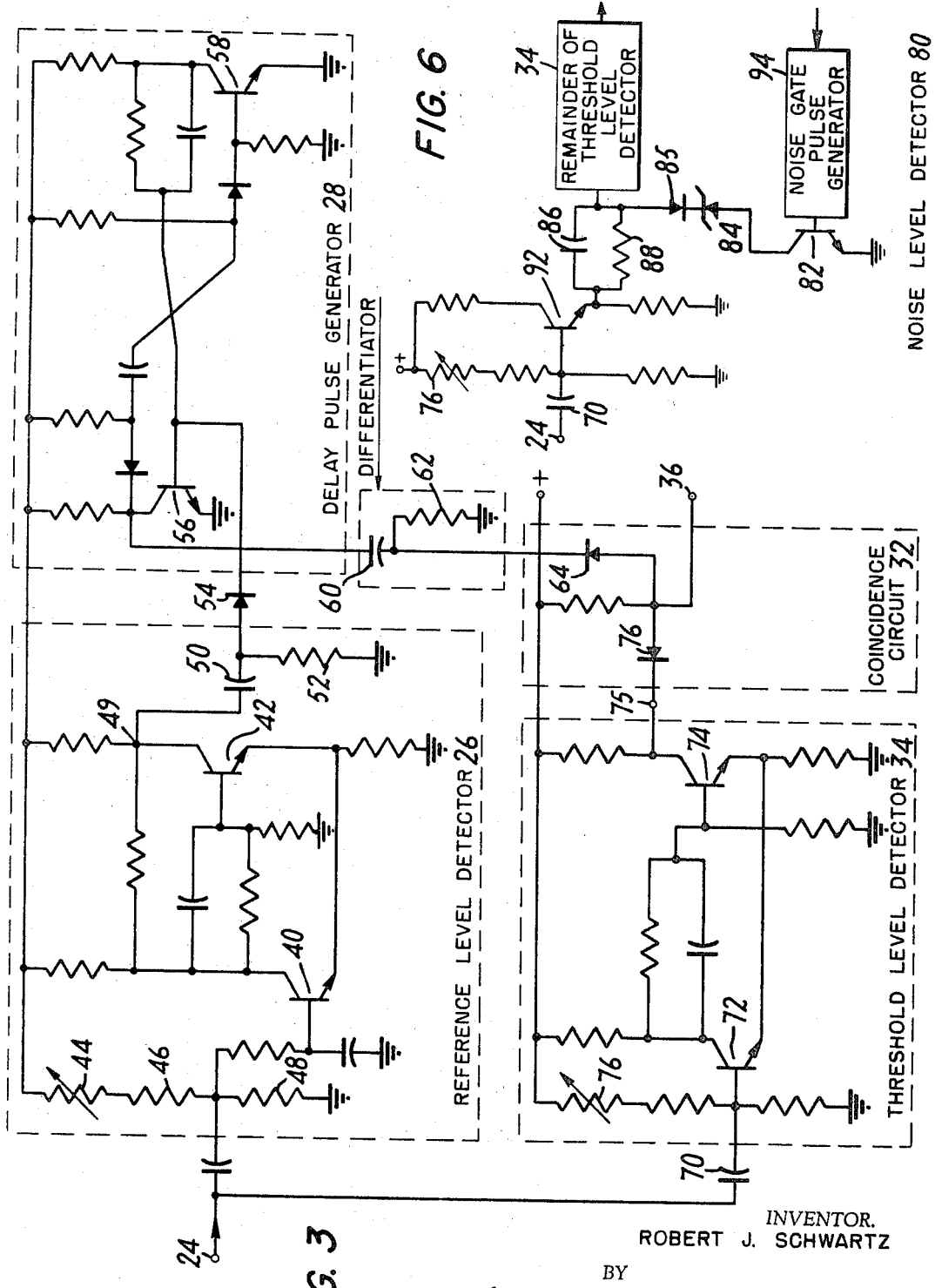

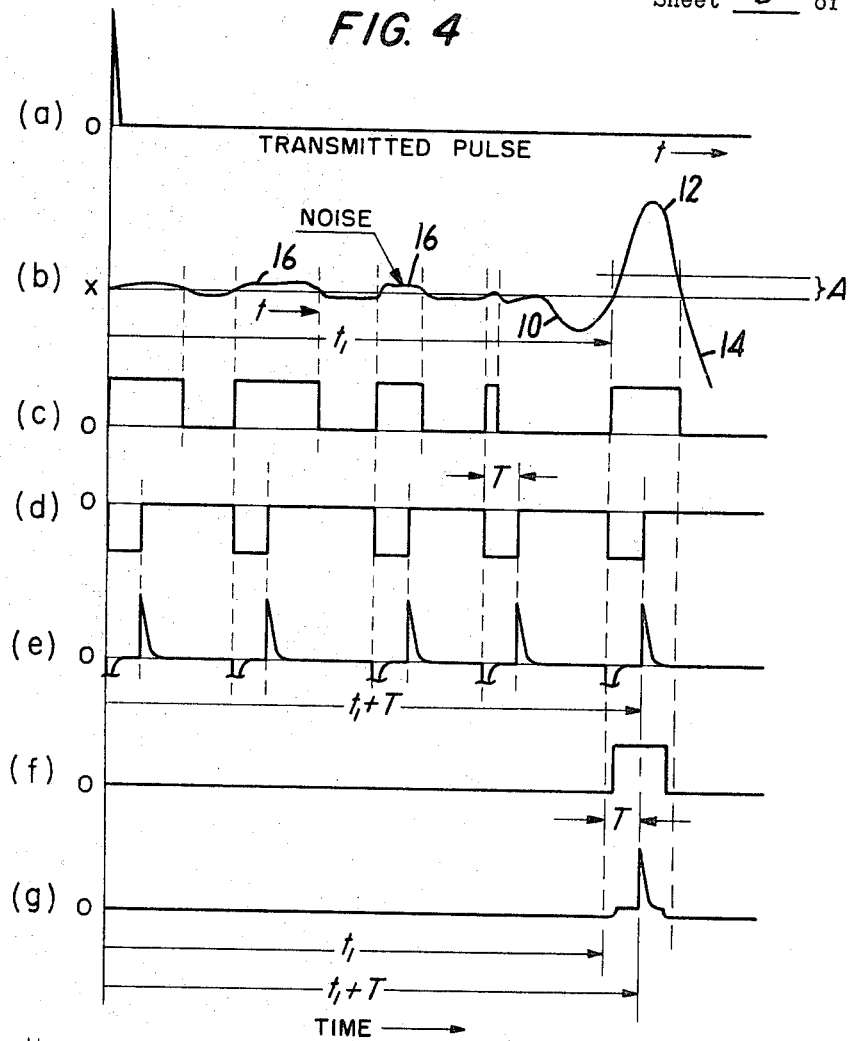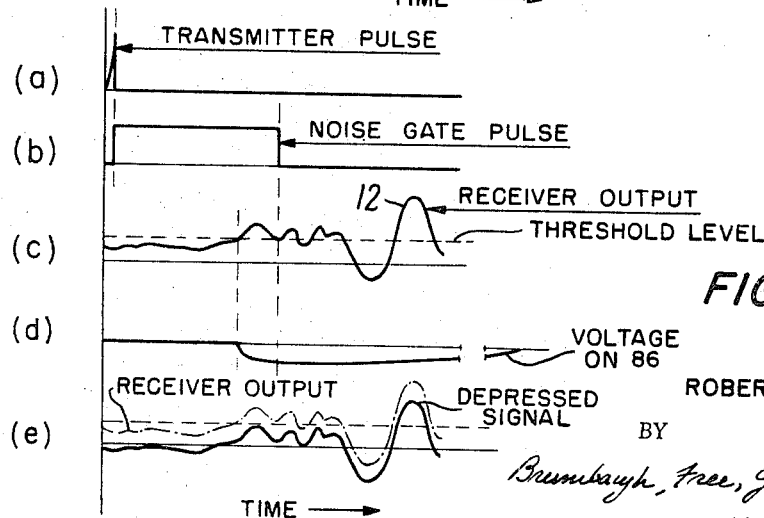

3,437,834
CIRCUIT FOR DETECTING TIME OF OCCURRENCE OF SIGNALS HAVING AN AMPLITUDE WHICH EXCEEDS A PREDETERMINED LEVEL
Robert J. Schwartz, Houston, Tex., assignor, by mesne assignments, to Schlumberger Technology Corporation, Houston, Tex., a corporation of Texas
Filed Aug. 27, 1965, Ser. No. 483,225
Int. Cl. H03k 5/20, 17/00
U.S. Cl. 307—235          11 Claims

ABSTRACT OF THE DISCLOSURE

Apparatus for accurately detecting the time of occurrence of an electrical input signal in which a first pulse is generated each time the amplitude of the input signal exceeds a preselected signal reference level, with the leading edge of the pulse occurring at the beginning of an excursion of the input signal amplitude beyond that level. In response to initiation of each such first pulse, a second pulse is generated having a fixed time duration. In addition, for each such excursion of the input signal amplitude beyond a given amplitude level having an absolute value greater than the reference level, a further pulse is generated. That further pulse, together with a pulse occurring at the trailing edge of the second pulse, feeds a coincidence circuit to produce at the output thereof an output pulse which bears a fixed time relation to the time at which the input signal crosses the reference signal level.

---

This invention relates to apparatus for detecting the time of occurrence of a selected signal. In particular, the invention relates to an improved apparatus for detecting the time at which the excursions of a selected signal depart from or cross a signal reference level.

As is well known, important characteristics of earth formations may be determined by measuring the time it takes for an acoustic energy signal to traverse a given distance through the formations, such as between an acoustic transmitter and receiver mounted on a logging tool in a borehole. Typically, the acoustic energy signal is detected by the acoustic receiver and the electrical signal output thereof amplified before being utilized in an elapsed time measuring system. Because the time interval between the transmitted and received signals traveling through one type of formation may be critically near the travel time for an acoustic signal in another formation, it is important to detect with consistent accuracy the time of arrival of the acoustic energy signal at the receiver.

There are, however, difficulties in determining the time of arrival of an acoustic signal which must be overcome in order to insure consistent detection at the same relative point in the received signal from measurement to measurement. One such difficulty is the presence of acoustic and electrical noise at the receiver, due in part to the reception of stray sonic energy and in part to the characteristics of the electronic equipment used in conjunction with the measurement. Another problem is presented by the fact that the received acoustic signal may vary in amplitude in successive measurements because of differing attenuation characteristics of the formations.

Accordingly, it is an object of the invention to provide an apparatus for accurately detecting the arrival time of a selected signal which overcomes the aforementioned difficulties.

Another object of the invention is to provide improved means for accurately detecting the arrival time signal, in which errors introduced by noise are virtually eliminated.

Still another object of the invention is to provide an improved apparatus for detecting the arrival time of a signal which is particularly useful in acoustic well logging systems.

The invention accomplishes these and other objects by providing detecting and pulse generating means which respond to excursions of an input signal from a first signal reference level to produce pulses of constant duration, and, to provide noise discrimination, additional pulse generating means responsive to input signals in excess of a predetermined amplitude level above the reference level to produce an additional pulse output. The latter are supplied along with the constant duration pulses to a time coincidence means to produce an output pulse when a coincidence in time occurs. Each such output pulse represents the time of crossing of the signal reference level by the first significant excursion of the received signal, displaced in time by the width of the constant duration pulses.

For a better understanding of the invention, reference may be made to the following detailed description, taken in conjunction with the accompanying drawings, in which:

FIGURE 1 is a graph illustrating typical receiver waveforms of the type found in acoustic logging systems;

FIGURE 2 is a block diagram of a preferred embodiment of the invention;

FIGURE 3 is a circuit schematic in accordance with the embodiment of FIGURE 2;

FIGURE 4 is a graph of various waveforms helpful in explaining the invention;

FIGURE 5 is a block diagram of a modified form of the embodiment of FIGURE 2;

FIGURE 6 is a circuit diagram in accordance with the modification in FIGURE 5; and FIGURE 7 is a graph of illustrative waveforms to aid in understanding the operation of the modification of FIGURES 5 and 6.

Turning now to FIGURE 1, graph (a) represents the waveform of a typical electrical signal which might be produced by the receiver in an acoustic logging system and which represents the waveform of the acoustic signal received thereat. Graph (b) illustrates a signal similar to that in graph (a), but having approximately one-half the amplitude thereof. These signals are oscillatory at a substantially constant frequency and may be described as having a first, positive peak or excursion 10, followed by a negative peak 12 having a peak value commonly three times that of the first peak 10 and a third, positive peak or excursion 14 whose amplitude is greater than the amplitude of the second peak 12. Thereafter, the successive negative and positive alternating peaks may be of decreasing amplitude. Preceding the arrival of acoustic energy from the transmitter, stray signals may reach the receiver or be generated therein to produce noise signals 16, 16' in the receiver output.

In accordance with one known detection technique, the time of arrival of the acoustic signal is selected to be the time at which the received output signal reaches a predetermined amplitude level, such as level A in FIGURE 1, which is greater than the level of the noise signals. While the latter are successfully avoided thereby, inaccuracies in time measurement are introduced by such level detection, as can be observed in FIGURE 1. A strong signal such as that represented in graph (a) will be detected at $t_1$, the time at which the signal excursion crosses the detection level A. In graph (b), however, the detection occurs at a later time $t_1'$, since the amplitude, and thus the slope, of the received signal is smaller. If the detection level is made higher, at level B, the time measurement error, $t_2' - t_2$, becomes even more pronounced, and if the detection level is increased still further, the signal excursion 14 of graph (b) will escape detection altogether.

It has also been suggested to determine the time of arrival of an acoustic signal by selecting a predetermined excursion, such as the first negative going peak irrespective of its amplitude, and detect one of the transition points of the excursion. A pulse output is produced at the detected excursion to serve as the time of arrival indication. However, since this technique does not discriminate against noise, it is subject to error. Moreover, its implementation requires the use of a delay line which is difficult to adjust with accuracy.

In contrast, the present invention utilizes both a transition point signal detector and a level-sensitive detector, the combination of which is capable of virually eliminating the erroneous effects of noise, and does not employ a delay line.

Referring now to FIGURE 2, a system block diagram of a time of arrival detector according to the invention is illustrated, the pertinent waveforms being shown in FIGURE 4. An acoustic transducer or receiver 20 converts the acoustic energy signal intercepted thereby into an electrical signal, which, in turn, is amplified by an amplifier 22. From the amplifier 22, the received signal, which may be inverted in polarity by the amplifier (FIGURE 4(b)), is supplied via junction 24 to two channels within the detector. One channel comprises a pulse-forming reference level detector 26 which provides a pulse corresponding to every excursion of an electrical signal from a reference level, e.g., zero, at the input (FIGURE 4(c)). It is preferable that the detector 26 be polarity selective so that, for example, only positive excursions of the input signal trigger the detector. This may be accomplished in any manner well known in the art, such as by a diode or biasing the detector input circuit.

A delay pulse generator 28 receives the pulses from the reference level detector 26 and, triggered by the leading edges of these pulses, provides a delay pulse of constant duration for each pulse from detector 26, regardless of its width. The delay pulses are preferably square waves (graph (d) in FIGURE 4), but may be any waveform having a distinct shape.

The delay pulses are then supplied to a differentiator 30 which provides sharp pulses of opposite polarities corresponding to the leading and trailing edges of the delay pulse (FIGURE 4(e)). The positive going pulses are then supplied to a coincidence circuit 32, the operation of which will be explained hereinafter.

As mentioned earlier, the amplitude of the second peak or excursion (12 in FIGURES 1 and 4) of the received signal is sufficient to provide reliable triggering of a pulse generating detector. Accordingly, a threshold level detector 34 in the other channel also receives the signal from the amplifier 22. This detector is triggered to provide a pulse only for an input signal excursion exceeding a predetermined amplitude level selected to be greater than the noise level and below the amplitude of the smallest significant signal excursion. The pulse output of the detector 34 is indicated in FIGURE 4(f).

The output of the detector 34 is also coupled to the coincidence circuit 32 which provides an output to a time recording system (not shown) when pulse outputs of the differentiator 30 and the detector 34 are coincidental in time, FIGURE 4(g). The output of the differentiator, in the case described, is a sharp pulse corresponding to the trailing edge of the constant duration delay pulse, and the signal at the output terminal 36 is a pulse representing the reference level transition point of the signal excursion 12, delayed in time from the transition point by the width of the delay pulse.

Thus, in accordance with the foregoing, each excursion of the input signal above the reference level triggers the delay pulse generator 28, but the threshold level detector 34 is responsive only to signal excursions having amplitudes above the noise level, thereby assuring detection of the time of arrival of acoustic energy signal. The output indication, however, is related directly to the reference level transition point of the detected signal excursion, thereby avoiding the inaccuracy resulting from variations in slope of the signal waveform.

The circuit diagram of the embodiment of FIGURE 2 is shown in FIGURE 3. The amplified signal from the receiver appearing at the junction 24 is supplied through suitable coupling impedance elements to the base of the transistor 40 in the reference level detector 26. The transistor 40 and the transistor 42, in conjunction with the associated resistance and capacitance elements, comprise what is known in the art as a Hecht trigger, which provides a rectangular pulse corresponding in width to the duration of each input voltage excursion in excess of the reference, or "zero," level.

The exact level at which triggering of the circuit 26 occurs may be regulated by the variable resistor 44 which, in conjunction with the voltage dividing resistors 46 and 48, permits the bias at the base of the transistor 40 to be varied. The pulses at the output 49 of the Hecht trigger, in response to the input signal shown in graph (b) of FIGURE 4, are illustrated in graph (c).

The rectangular pulses appearing at terminal 49 are coupled, through a differentiator circuit consisting of capacitor 50 and resistor 52, and a rectifying diode 54 to supply sharp positive pulses corresponding to the leading edges of the rectangular pulses, to the delay pulse generator 28. The delay pulse generator 28 is a "one shot" or monostable multivibrator whose active elements are the transistors 56 and 58 and which generates the negative square, constant-width pulses shown in graph (d) of FIGURE 4.

The latter are supplied to the differentiator 30, comprising the capacitor 60 and the resistor 62, the output of which is applied to the cathode of the diode 64 in the coincidence circuit 32. The output waveform of the differentiator 30 is shown in graph (e) (FIGURE 4), with the negative peaks shown only in part. Preferably, the width of the pulses from the pulse generator 28 is approximately one-quarter of the received signal period, whereby the positive peaks from the differentiator occur approximately when the positive input signal peaks reach their maximum values.

The received signal is also applied through the coupling capacitor 70 to the threshold level detector 34, which in a preferred form is a Schmitt trigger, as shown in FIGURE 3. An explanation of the operation of the Schmitt trigger can be found in Transistor Manual, General Electric Co. (1959), p. 122. The trigger circuit 34 provides at its output 75 a square wave pulse, the duration of which corresponds to the time interval during which an input signal to th base of the transistor 72 exceeds a predetermined threshold level A (graph (b) of FIGURE 4) set by the transistor 74 and the potential at the base of the transistor 72. This potential may be varied by adjusting the bias resistor 76. The output of the threshold level detector 34 is connected to the cathode of diode 76 in the coincidence circuit 32.

As shown, the coincidence circuit 32 may be conveniently an "and" gate which provides an output at the terminal 36 only when there is time coincidence of positive pulses at the cathodes of each of the diodes 64 and 76. Graphs (e) and (f) represent the inputs to the coincidence circuit 32 from the differentiator 30 and the threshold level detector 34, respectively, for the input waveform of graph (b). Graph (g) represents the corresponding output pulse, which is delayed from the reference level transition time $t_1$ (the detected time of arrival of the received signal) by an amount T, which, as will be recalled, is the known width of the delay pulse shown in graph (d).

FIGURE 5 represents a modified form of the embodiment of FIGURE 2, showing a noise level detector circuit 80 adapted to be interposed in the input of the threshold level detector 34. In brief, the noise level detector 80 depresses the input signal, effectively setting a new threshold level for the threshold level detector 34 whenever, within certain periods of time, the noise at the input terminal 24 exceeds the threshold level A (FIGURE 7(c)).

In acoustic well logging applications, it is conventional to generate a gate pulse having a duration slightly less than the time interval between the transmitted and received acoustic signals to render the receiver inoperative and thus insensitive to spurious signals during this interval. The time relationship between the transmitted acoustic signal (or a marker pulse corresponding thereto), the noise gate pulse, and the received signal can be observed in graphs (a), (b) and (c) of FIGURE 7.

Referring now to the circuit diagram of FIGURE 6, a transistor 92 in the emitter follower configuration and a capacitor 86 and resistor 88 in parallel, are coupled between the voltage divider network including variable resistor 76 and the base of transistor 72 of the threshold level detector 34. A diode 85, Zener diode 84 and the collector-emitter path of a gate transistor 82 are connected in series between the common connection of the resistance-capacitance combination 88, 86 and the base of transistor 72, and reference potential. The noise gate pulse from the generator 94 is applied to the base of the transistor 82.

The application of the noise gate pulse to the transistor 82 renders it conductive and completes a conducting series path through the diode 85 and the reverse connected Zener diode to reference potential. The reverse breakdown voltage of the Zener diode is selected to be below the threshold level by an amount substantially equal to the drop across the diode 85 when conducting.

Noise energy supplied via the low impedance source provided by the emitter follower 92 is applied to resistor capacitor combination 88, 86 during the noise gate interval (FIGURE 7(c)). If it exceeds the threshold amplitude established by the diodes 84, 85, conducting path is completed through these diodes, charging capacitor 86 to a potential approximately equal to the excess of the noise voltage over the threshold amplitude (FIGURE 7(d)).

Upon termination of the noise gate pulse, the following signal input, including the receiver signal, is depressed in level by an amount equal to the potential on the capacitor 86 (FIGURE 7(e)). Thus before the threshold level detector is triggered, the input signal must exceed the preselected threshold level plus the potential on capacitor 86. This further minimizes the possibilities of premature triggering on noise pulses but does not materially affect the response to received signals since the signal peak 12 normally is of sufficient amplitude to overcome the capacitor potential. The discharge time constant for the capacitor 86, including the emitter resistance of the emitter follower, is made sufficiently long to provide the necessary potential during an individual signal reception period but not long enough to affect the succeeding cycle.

Although the noise level detecting arrangement 80 is shown incorporated in the threshold level detector 34, it may be added as a separate unit between the capacitor 70 and the input to the detector 34.

If the noise frequency is such that its half-cycle period is less than the noise gate pulse, it is possible that the noise level detector 80 will not have time to shift the threshold level, since the circuit of FIGURE 6 responds only to positive excursions of the input signal. Accordingly, an inverted input signal may be derived from the input signal and also supplied to the noise level detector 80 so that a signal of proper polarity is always available, irrespective of frequency.

From the foregoing, it will be seen that the input signal transition point detector may be made completely free from the effects of noise and other stray signals and that it furthermore provides reliable detection of a selected input signal without the necessity of delay lines and the like. When a detector in accordance with the invention is employed in acoustic logging apparatus, the time of arrival of a selected input signal may be consistently detected, notwithstanding the possibility that the noise level exceeds a predetermined threshold level within the detector, thereby enabling increased logging accuracy.

The embodiments of the invention described herein are illustrative only, it being understood that many variations and modifications may be made by one skilled in the art without departing from the spirit and scope of the invention.

I claim:
1. For use in borehole logging systems and the like, apparatus for detecting the time of occurrence of an electrical input signal corresponding to the occurrence of an event detected by a signal source located in the borehole, comprising first input means responsive to said input signal for generating a first pulse whose leading edge corresponds in time to the beginning of an input signal excursion from a preselected signal reference level, means responsive to said first pulse for generating a second pulse having a fixed time duration, second input means responsive to said input signal for generating an additional pulse corresponding to any excursion of the input signal beyond a given amplitude level having an absolute value greater than said reference level, and means for combining said second pulse and said additional pulse to generate an output signal upon time coincidence of the trailing edge of a second pulse and said additional pulse.

2. For use in borehole logging systems and the like, apparatus for detecting the time of occurrence of an electrical input signal corresponding to a received acoustic signal at a signal source within the borehole, comprising first input means responsive to the input signal for generating a first series of pulses whose leading edges correspond in time to the beginnings of input signal excursions from a preselected signal reference level, means coupled to said first input means for differentiating said first series of pulses, means responsive to the differentiated said first series of pulses for generating a second series of pulses each having a fixed time duration, second input means responsive to the input signal for generating additional pulses corresponding to excursions of the input signal beyond a preset amplitude level having an absolute value that is greater than said reference level, and means for combining said second series of pulses and said additional pulses to generate an output signal upon time coincidence of the trailing edge of a pulse of said second series and one of said additional pulses.

3. For use in borehole logging systems and the like, apparatus for detecting the time of occurrence of an electrical input signal corresponding to the occurrence of an event detected by a signal source within the borehole, comprising first input means responsive to the input signal for generating a first series of pulses whose leading edges correspond in time to the beginnings of input signal excursions from a preselected signal reference level, means coupled to said first input means for producing from said first series of pulses a series of triggering pulses whose leading edges correspond to the leading edges of pulses of said first series, means triggered by said triggering pulses for generating a second series of pulses of predetermined fixed time duration, means coupled to said triggered means for differentiating said second series of pulses, second input means responsive to the input signal for generating additional pulses corresponding to excursions of the input signal beyond a predetermined amplitude level having an absolute value greater than said reference level, and means responsive to said differentiated second series of pulses and said additional pulses for generating an output pulse upon time coincidence of the trailing edge of a pulse of said differentiated second series of pulses and one of said additional pulses.

4. Apparatus in accordance with claim 3 wherein said second series of pulses are rectangular pulses and wherein the time duration of each of said second series of pulses is less than the time duration of excursions of the input signal from the reference level.

5. Apparatus in accordance with claim 3 further comprising means interposed between said triggering pulse generating means and said triggered means for selecting triggering pulses of predetermined polarity.

6. For use in borehole logging systems and the like, apparatus for detecting the time of occurrence of an electrical input signal developed in response to the occurrence of an event at a signal source within the borehole, input means responsive to the input signal for generating a first series of pulses whose leading edges correspond in time to the beginnings of input signal excursions from a preselected signal reference level, means responsive to each pulse of said first series for generating a second series of pulses of predetermined constant time duration, means responsive to the input signal for modifying the amplitude of said input signal in accordance with noise levels of said input signal beyond a predetermined amplitude level having an absolute value greater than said reference level, means responsive to said modified input signal for generating additional pulses corresponding to excursions of the modified input signal beyond said amplitude level, and means for combining said second series of pulses and said additional pulses to generate an output signal upon time coincidence of the trailing edge of a pulse of said second series and one of said additional pulses.

7. In an acoustic logging system of the type providing a gate pulse during an interval between transmitted and received acoustic signals and including means for detecting excursions of an electrical input signal beyond a predetermined signal amplitude level, apparatus for modifying the amplitude of the input signal in accordance with noise levels of said input signal in excess of said predetermined amplitude level, comprising a charging circuit having an output coupled to the input of the detecting means and an input receiving the input signal, and means responsive to said gate pulse coupled to said output for providing a charging path for the input signal through said charging circuit whenever the value of the input signal noise level exceeds said predetermined amplitude level in the duration of said gate pulse.

8. In an acoustic logging system of the type providing a gate pulse during an interval between transmitted and received signals and including means for detecting excursions of an electrical input signal beyond a predetermined amplitude level, apparatus for modifying the amplitude of the input signal presented to the detecting means, comprising signal storage means having an output coupled to the input of said signal excursion detecting means, means supplying said input signal to the input of said signal storage means, and switching means in circuit with said signal storage means and responsive to said gating pulse to provide a charging path for said input signal through said signal storage means, said switching means including means to limit charging of said signal storage means to input signals having an amplitude greater than said predetermined amplitude level.

9. Apparatus according to claim 8 wherein said signal storage means includes a capacitor.

10. Apparatus according to claim 9 wherein said switching means includes a Zener diode for establishing a voltage reference for limiting the charging of said capacitor to input signals above said reference level.

11. Apparatus according to claim 10 further including means providing a discharge path for said capacitor with a time constant such that a significant portion of the charge on said capacitor is retained for a period of time encompassing the received signal following said gate pulse.

References Cited
UNITED STATES PATENTS 2,963,646  12/1960  Hicks et al.
3,237,153  2/1966  Blizard.

ARTHUR GAUSS, *Primary Examiner.*

S. T. KRAWCZEWICZ, *Assistant Examiner.*

U.S. Cl. X.R.

328—150, 242, 165, 110; 307—264; 181—.5; 250—83.6